United States Patent Office 3,507,458
Patented Apr. 21, 1970

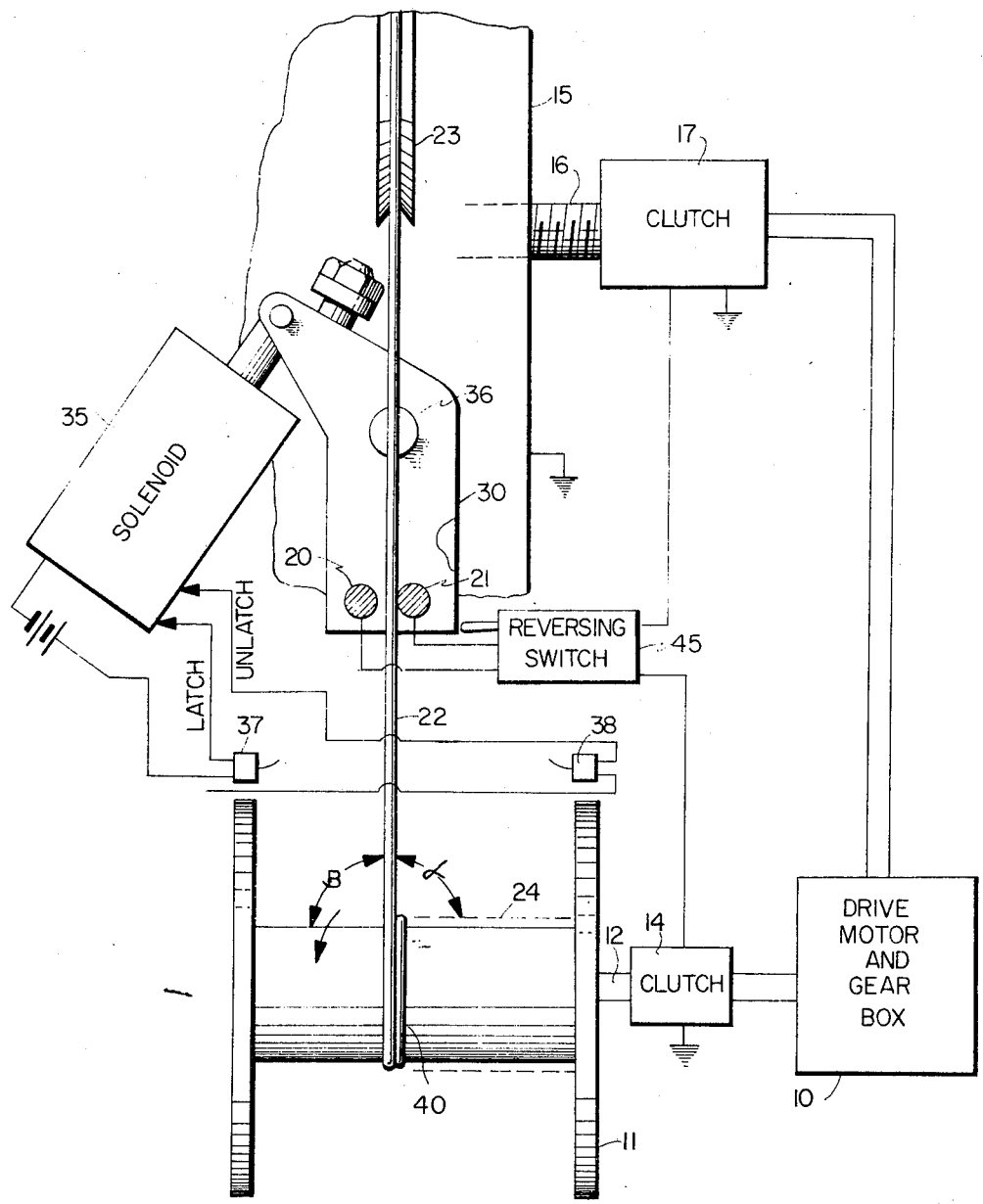

3,507,458
WIRE WINDING MACHINES WITH SPEED SENSING CONTROLS
Chester O. Merchant, and William R. White, Owensboro, Ky., assignors to Kentucky Electronics, Inc., Owensboro, Ky., a corporation of Delaware
Filed Sept. 5, 1968, Ser. No. 757,639
Int. Cl. B65h 57/28
U.S. Cl. 242—158.4          9 Claims

ABSTRACT OF THE DISCLOSURE

In a machine feeding wire on a rotating reel by a mechanism traversing back and forth, the rate of feed is controlled at two angular limits of feed from the traversing mechanism to respectively disengage a clutch in the rotating reel drive or the traversing drive means. The angular limits are changed as the traverse direction changes to establish a proper lead angle on the feed of wire.

---

This invention relates to level layer winding machines of the sort described in our U.S. Patent 3,391,880 issued July 9, 1968, which is incorporated herein by reference to form part of this disclosure, and more particularly, it relates to improvements in precisely controlling the rates of feed of wire over varying conditions and wire sizes.

When winding machines are used for wires of various diameters, it is difficult to arrange with gearing or analog speed controls for exact driving speeds for rotation of reels and traversing mechanisms. Also varying conditions are encountered such as changes of size with temperature and changes of reel speed with the number of layers that require adjustments of speeds from time to time to keep the winding mechanism within proper working limits for level winding without traversing too fast and introducing spaces or traversing too slowly and overlapping layers.

Accordingly, it is an object of this invention to produce simplified control apparatus which will automatically adjust the speed of traverse for different sizes of wires.

In accordance with the invention therefore a programmable clutch is introduced into both the reel drive rotation means and the wire feed traversing means and the position of the wire is sensed as it leaves the feed means at predetermined angles of lead or lag greater than that at which proper level winding action takes place to thereby cause the corresponding clutch to intermittently disconnect the drive until a correction takes place.

The foregoing and additional features and objectives of the invention are set forth in the following description of the invention which refers to the embodiment set forth in the accompanying drawing, wherein the single figure is a partial broken-away view, partly in schematic, of wire traversal and reeling control apparatus afforded by the invention.

Referring now to the figure, it is seen that a common motor and gear drive box 10 commonly rotates reel 11 by way of shaft 12 while it moves the traversing assembly 15 back and forth by way of screw 16 in the manner described in the aforesaid patent.

In accordance with this invention, clutches 14 and 17, preferably electro-magnetically actuated, are introduced in the respective drive shafts and are controlled by sensing means such as the guide rods 20, 21 which engage the wire 22 when it leads or lags too much on its path from V-shaped trolley wheel 23 onto a level wound layer 24 on reel 11. To properly feed the wire should slide over the last wound turn and thus the winding angle $\alpha$ should be slightly less than 90°.

Consider rods 20 and 21 to be conductive and insulated from the baseplate 30, so that a connection with bare wire can be made directly thereon to ground one or the other rod as the proper angular limits are exceeded, through connection with reel 11 or trolley reel 23 and thus frame 15. Alternatively, sensitive switch assemblies could be used on or within the rods 20 and 21 if desired.

The clutch boxes 14 and 17 then contain an actuating solenoid and power source operable upon contact of the wire 22 with the corresponding rod 20 or 21 to disconnect the drive motor 10 from the respective reel 11 or traverse frame 15. The clutches are in driving position until disengaged by electromechanical actuation.

However, since the traverse mechanism changes direction at either end of the reel 11, and the wire feed angle is not exactly 90°, a solenoid 35 is provided to change the position of limit rods 20, 21 about pivot shaft 36 and reverse the clutch wires through reversing switch 45. When energized by the rim detector switch 37, the solenoid moves these rods to the right and causes the angle $\beta$ to achieve somewhat less than 90°. If the solenoid 35 is of the latching type, the alternate rim sensing switch 38 will release the latch to return the solenoid into the position shown for the right to left traversal cycle illustrated.

Therefore, in operation the system will proceed to wind wire without disengaging the clutches as long as wire 22 is between and does not contact either rod 20 or 21. The gears in box 10 are preferably chosen to approximate the speed for this operation depending upon the wire diameter. If the traverse mechanism leads as shown so wire 22 touches rod 21, then clutch 17 is deenergized to disengage screw 16 temporarily until the wire is removed from contact with rod 21. On the other hand, if the traverse table 15 lags the position of the last turn of wire 40 on reel 11, then the wire 22 will contact rod 20 and disengage clutch 14 and stop or slow rotation of reel 11 long enough for the traverse mechanism to be positioned to return wire 22 to its nominal position between its two limiting positions not in contact with either of the rods 20 or 21.

Having therefore described an embodiment of the invention and its mode of operation, those features of novelty believed descriptive of the spirit and nature of the invention are set forth with particularly in the appended claims.

What is claimed is:
1. Control apparatus in wire winding and reeling means having a traversing wire feed assembly moving axially back and forth across a rotating reel to feed a wire thereon, comprising in combination, detector means for sensing said wire when it departs from a predetermined angular limit both ahead and behind the traversing feed assembly, drive means responsive to rotate said reel at a different speed when said wire is sensed at one limit and drive means responsive to traverse the wire across said reel at a different speed when said wire is sensed at the other limit.
2. Control apparatus as defined in claim 1, wherein the traversing feed assembly has structure feeding the wire between a pair of closely positioned rods, and means responsive to contact of the wire and with either one of said rods to respectively indicate said angular limits.
3. Control apparatus as defined in claim 1, wherein the means changing the reel speed comprises a selectively operable clutch programmed by said detector means to disengage the rotation.
4. Control apparatus as defined in claim 1, wherein the means changing the traverse speed comprises a selectively operable clutch programmed by said detector means to disengage the traversal.
5. Control apparatus as defined in claim 1, comprising direction determining means sensing the traversal of said feed assembly in opposite directions and means moving a mechanism in said detector means to change the predetermined angular limits in response to changes in the direction of wire feed sensed by said direction determining means.

6. Control apparatus as defined in claim 1, wherein both said drive means comprise a clutching mechanism intermittently operated to disconnect the drive to respectively slow down the speed of rotation or traversal whenever the detector means senses departure from a corresponding one of said limits.

7. Control apparatus as defined in claim 1, wherein said detector means operates at various positions throughout the feed position of wire as it is wound in multiple layers upon said reel.

8. Control apparatus as defined in claim 1, wherein at least one of said drive means is responsive to on-off control in response to sensing of wire at a corresponding limit by said detector means.

9. Control apparatus as defined in claim 1, comprising direction determining means sensing the traversal of said feed assembly in opposite directions and means moving a mechanism in said detector means to reverse both drive means in response to changes in the direction of wire feed sensed by said direction determining means.

References Cited

UNITED STATES PATENTS

| | | | |
|---|---|---|---|
| 3,231,208 | 1/1966 | Kaufmann | 242—158.4 |
| 3,391,880 | 7/1968 | White et al. | 242—158.4 |

NATHAN L. MINTZ, Primary Examiner